US006596438B2

(12) United States Patent
Zeng

(10) Patent No.: US 6,596,438 B2
(45) Date of Patent: Jul. 22, 2003

(54) ALKALINE CELL WITH IMPROVED CATHODE

(75) Inventor: Shuming Zeng, Brookfield, CT (US)

(73) Assignee: The Gillette Company, Boston, MA (US)

(*) Notice: Subject to any disclaimer, the term of this patent is extended or adjusted under 35 U.S.C. 154(b) by 71 days.

(21) Appl. No.: 09/880,651

(22) Filed: Jun. 13, 2001

(65) Prior Publication Data

US 2003/0008211 A1 Jan. 9, 2003

(51) Int. Cl.[7] .................................. H01M 4/62
(52) U.S. Cl. .................. 429/232; 429/224; 429/229; 429/206
(58) Field of Search ............... 429/232, 224, 429/229, 206

(56) References Cited

U.S. PATENT DOCUMENTS

| | | | |
|---|---|---|---|
| 4,005,183 A | 1/1977 | Singer | 423/447.2 |
| 4,016,247 A | 4/1977 | Otani et al. | 426/447.4 |
| 4,039,473 A | 8/1977 | Schafer | 502/427 |
| 4,082,694 A | 4/1978 | Wennerberg et al. | 252/444 |
| 4,208,267 A | 6/1980 | Diefendorf et al. | 208/22 |
| 4,303,631 A | 12/1981 | Lewis et al. | 423/447.1 |
| 4,894,296 A * | 1/1990 | Borbely et al. | 429/27 |
| 4,946,663 A | 8/1990 | Audley et al. | 423/447.1 |
| 5,482,798 A | 1/1996 | Mototani et al. | 429/224 |
| 5,594,060 A | 1/1997 | Alig et al. | 524/496 |
| 6,251,539 B1 * | 6/2001 | Brys et al. | 429/229 |
| 6,451,486 B1 * | 9/2002 | Davis et al. | 429/232 |
| 2002/0134964 A1 * | 9/2002 | Christian et al. | 429/232 |

OTHER PUBLICATIONS

International Committee for Characterization and Terminology of Carbon, Journal Carbon (1982), vol. 20, pp. 445–449.

* cited by examiner

Primary Examiner—Laura Weiner
(74) Attorney, Agent, or Firm—Barry D. Josephs; Paul I. Douglas; Thomas G. Krivulka

(57) ABSTRACT

An alkaline electrochemical cell having a cathode comprising manganese dioxide and conductive graphitized mesophase pitch-based carbon fibers having an increased BET surface area of between about 10 and 60 $m^2/g$, desirably between about 10 and 50 $m^2/g$, preferably between about 30 and 50 $m^2/g$ by heat treatment between 800 and 1200° C. with potassium hydroxide. The treated graphitized mesophase pitch-based carbon fibers can comprise between about 1 and 100 percent by weight of the total graphite material in the cathode, typically between about 5 and 50 percent by weight of the total graphite. The total graphite in the cathode desirably comprises between about 4 and 10 percent by weight of the cathode. The graphite can be the mixtures of the graphitized mesophase pitch-based carbon fibers with flaky crystalline graphites including expanded graphites. The graphitized mesophase pitch-based carbon fibers have a mean average diameter typically between about 1 and 10 micron. The use of said carbon fibers in the cathode increases cathode conductivity and results in improved cell performance.

29 Claims, 1 Drawing Sheet

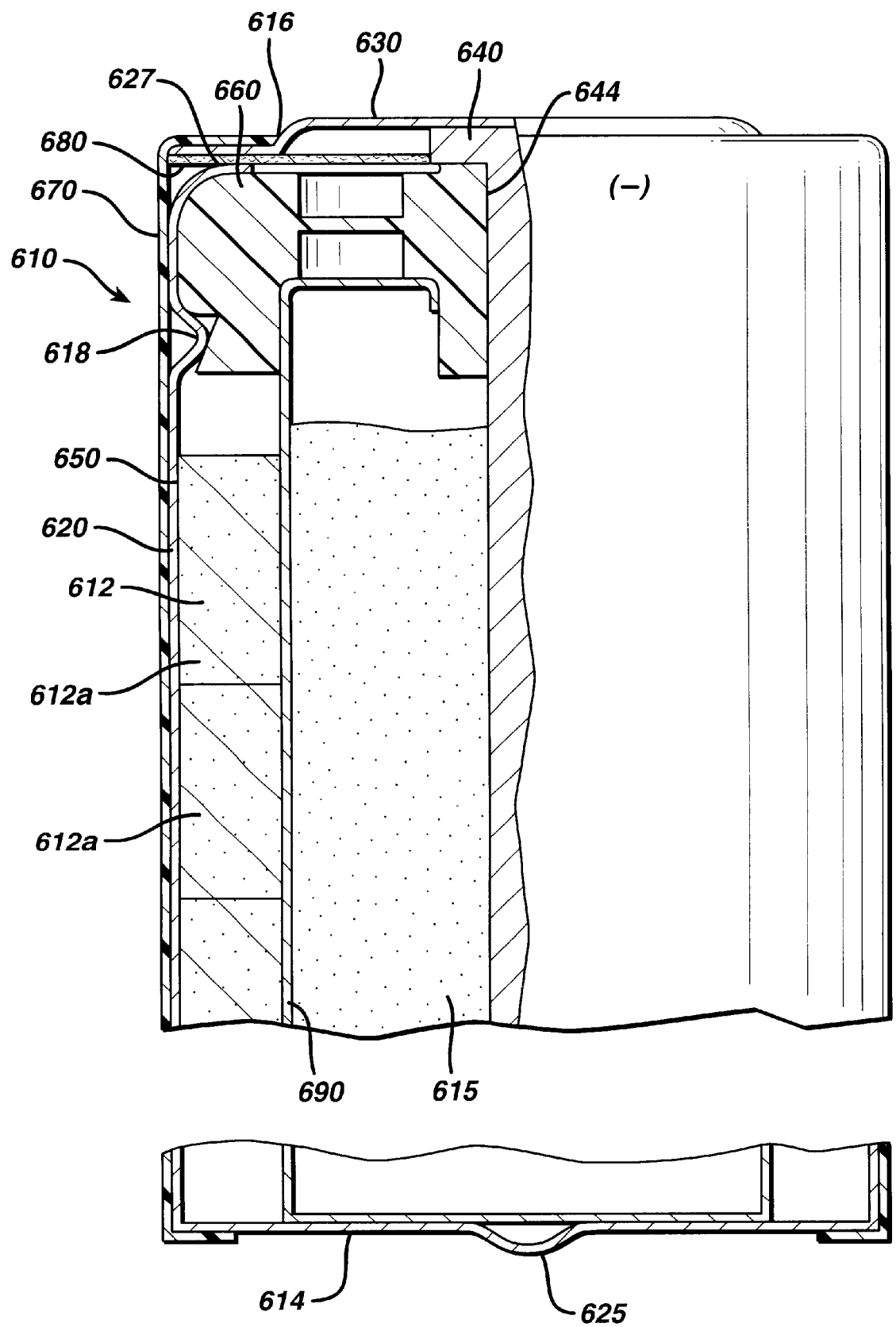

ALKALINE CELL WITH IMPROVED CATHODE

FIELD OF THE INVENTION

This invention relates to an improved cathode mixture comprising manganese dioxide and carbon fibers, particularly graphitized mesophase pitch-based carbon fibers.

BACKGROUND OF THE INVENTION

Conventional alkaline electrochemical cells are formed of a cylindrical casing. The casing is initially formed with an enlarged open end and opposing closed end. After the cell contents are supplied, an end cap with insulating plug is inserted into the open end. The cell is closed by crimping the casing edge over an edge of the insulating plug and radially compressing the casing around the insulating plug to provide a tight seal. A portion of the cell casing at the closed end forms the positive terminal.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, polymeric binders, and other additives, such as titanium-containing compounds can be added to the cathode.

Since manganese dioxide typically exhibits relatively low electric conductivity, an electrically conductive additive is needed to improve the electric conductivity between individual manganese dioxide particles. Such electrically conductive additive also improves electric conductivity between the manganese dioxide particles and the cell housing, which also serves as cathode current collector. Suitable electrically conductive additives can include, for example, conductive carbon powders, such as carbon blacks, including acetylene blacks, flaky crystalline natural graphite, flaky crystalline synthetic graphite, including expanded or exfoliated graphite.

It is desirable for a primary alkaline battery to have a high discharge capacity (i.e., long service life). Since commercial cell sizes have been fixed, it is known that the useful service life of a cell can be enhanced by packing greater amounts of the electrode active materials into the cell. However, such approach has practical limitations such as, for example, if the electrode active material is packed too densely in the cell, the rates of electrochemical reactions during cell discharge can be reduced, in turn reducing service life. Other deleterious effects such as cell polarization can occur as well. Polarization limits the mobility of ions within both the electrolyte and the electrodes, which in turn degrades cell performance and service life. Although the amount of active material included in the cathode typically can be increased by decreasing the amount of non-electrochemically active materials such as polymeric binder or conductive additive, a sufficient quantity of conductive additive must be maintained to ensure an adequate level of bulk conductivity in the cathode. Thus, the total active cathode material is effectively limited by the amount of conductive additive required to provide an adequate level of conductivity.

Further, it is highly desirable to enhance the performance of an alkaline cell at high rates of discharge. Typically, this is accomplished by increasing the fraction of conductive additive in the cathode in order to increase overall (bulk) electric conductivity of the cathode. The fraction of conductive additive within the cathode must be sufficient to form a suitable network of conductive particles. Typically, when the conductive additive is a conductive carbon, about 3 to 15, desirably between 4 to 10 weight percent of the total mixture are required. However, an increase in the amount of conductive carbon produces a corresponding decrease in the amount of active cathode material, giving lower service life. Conventional powdery conductive carbons such as acetylene black have large volume in a certain weight but lower electric conductivity than the flaky, crystalline natural or synthetic graphite, which possess a three-dimensional crystal structure as described below. The less conductive nature of carbon blacks leads to high carbon content in cathode electrode and less electrochemically active material, in turn, to the shorter service life of electrochemical cells.

To increase the electric conductivity of carbonaceous materials, a thermal process known as graphitization is applied to convert carbons into graphite material or graphite product. Such a graphitic product is characterized by a distinctive three-dimensional graphitic crystal structure. The crystalline structure is composed of individual unit cells which are repeatable in the "a" and "c" directions. The graphite crystalline structure has a unit cell which is generally of a three dimensional hexagonal (six sided) shape. The base of the hexaganol unit is defined by a hexagonal plane of sides "a" of equal size and separated from each other by 120 degrees. The hexaganol plane defines the "a" direction of the crystalline structure. The thickness of the unit cell is defined by the height of the unit cell defined by the axis "c" which is perpendicular to said hexagonal plane lying in the "a" direction. A reference to such hexaganol unit cells using the same standard nomenclature can be found, for example, in F. Daniels and R. Alberty, *Physical Chemistry, 2$^{nd}$ Edition*, John Wiley & Sons (1961), pp. 622–623. The unit cells are repeatable in the "a" direction and "c" direction up to a point where they abruptly change orientation. This defines the bounds of the crystalline structure in the "a" and "c" directions. Different graphites have different number of repeatable unit cell in the "a" and "c" direction. (The size of each repeatable unit cell for graphites will be the same.) The size of the crystalline structure (crystalline size) for a specific graphite can be defined by the distance La of the crystalline structure in the "a" direction which spans the total number of repeat units in the "a" direction, and the distance Lc in the "c" direction which spans the total number of repeat units in the "c" direction. The number of unit cells in the "a" direction can be determined by dividing the distance La by the size of the unit cell in the "a" direction. Conversely, the number of unit cells in the "c" direction can be determined by dividing the distance Lc by the size of the unit cell in the "c" direction.

In most graphitic products, for example, natural graphite, the Lc and La distances defining the crystalline size as measured by x-ray diffraction are typically in the range of 1000 to 3000 Angstrom. Expanded graphite, a typical exfoliated graphite, can have a large La of about 500 to 1000 but typically a smaller Lc of about 300 to 1000, typically between about 400 to 600 Angstrom due to chemical exfoliation in this direction. Due to the anisotropy of graphite in the "a" and "c" directions of the crystal unit cell, the La normally contributes to electric and thermal conductivity of a graphite more than Lc does. In order to provide good electric conductivity, it is desirable to use graphite including natural and synthetic graphite that have a La greater than 100, more typically between 100 to 300 Angstrom in the cathode of an alkaline cell. Conventional powdery conductive carbons such as acetylene black have small La, typically in the range below 100 Angstrom. These materials, therefore, have low electric conductivity.

After graphitization the crystal sizes such as Lc and La of carbon increase. Physical properties, for example, the electric conductivity can be improved significantly. Some carbon materials, depending on their molecular structure cannot be completely converted to graphite or only partially converted to graphite. Such materials are classified as non-graphitizable or hard carbons, while those carbons that can be easily graphitized are termed graphitizable. The graphitized carbons normally have higher electric conductivity than the non-graphitized hard carbons.

Carbon fibers (not graphites) are synthetic carbon materials taking the forms of fibers or thin strands of carbon material. Such carbon fibers can be classified into four types based on the precursors and processes used during their manufacture: 1) rayon based carbon fibers, 2) polyacrylonitrile (PAN) based carbon fibers, 3) pitch-based carbon fibers (PCF), and 4) catalyzed vapor growth carbon fibers (VGCF). The pitch-based carbon fibers (PCF) can further be classified into isotropic pitch-based and the mesophase pitch-based carbon fiber (MPCF). Most carbon fibers are not graphitizable. However, mesophase pitch-based carbon fiber (MPCF) and vapor growth carbon fiber (VGCF) are graphitizable. The graphitized mesophase pitch-based carbon fibers (GMPCF) generally have a much higher electrical conductivity than MPCF, the non-graphitizable form such as isotropic pitch-based carbon fiber and other carbon fibers such as rayon or polyacrylonitrile (PAN)-based carbon fibers. The diameter of carbon fibers can vary from about less than 1 micron ($1 \times 10^{-6}$ meter), e.g., in the case of vapor growth carbon fibers to about 5 to 10 micron (5 or $10 \times 10^{-6}$ meter) and even up to 100 micron ($100 \times 10^{-6}$ meter), e.g. in the case of mesophase pitch carbon fibers. Mesophase pitch-based carbon fibers (MPCF) and graphitized mesophase pitch-based carbon fibers (GMPCF), typically have a diameter between about 5 and 10 micron, more typically between about 5 and 7 microns. Conventional mesophase pitch-based carbon fibers and graphitized mesophase pitch-based carbon fibers have a BET surface area between about 0.2 and 5.0 $m^2/g$, more typically 0.5 to 3 $m^2/g$.

Typically, natural and synthetic graphite materials including expanded graphite are in a flaky crystalline form. They can have average particle sizes ranging from about 2 to 50 microns. A suitable flaky natural crystalline graphite having an average particle size of about 12 to 15 microns is commercially available under the tradename "MP-0702X" or "NdG-15" from Nacional de Grafite. Suitable expanded graphites typically have average particle sizes ranging from 0.5 to 40 microns. As described hereinabove, expanded graphite can be natural graphite or synthetic graphite wherein the graphite crystal lattice has been uniaxially expanded. Such expansion reduces the crystalline sizes of expanded graphite particles in c-axis direction, but still maintains large crystalline dimension in a-axis direction. The expanded graphite thus can exhibit a much higher aspect ratio (i.e., ratio of thickness to diameter) in term of crystalline size. Meanwhile, expansion in c-direction creates large volume within the graphite particles, resulting in increase in bulk volume and particle size. The large particle size and high aspect ratio of expanded graphite relative to flaky natural or synthetic graphites suggest that expanded graphite can provide an increase in the number of points and/or surfaces that contact each other and as well with the manganese dioxide particles. This in turn can provide enhanced conductivity in cathodes formed from mixtures thereof. Suitable expanded graphites are available commercially, for example, from Chuetsu Graphite under the tradename "DCN-2", Timcal AG under the tradename "BNB90", and Superior Graphite under the tradename "ABG-40. Cathode containing expanded graphite usually has better electric conductivity than that with small particle flaky natural graphite.

The use of expanded graphite as a conductive additive in cathodes of conventional alkaline primary cells is known and disclosed for example, in U.S. Pat. No. 5,482,798. A suitable expanded graphite having an average particle size ranging from 0.5 to 15 microns, preferably from 2 to 6 microns is disclosed in U.S. Pat. No. 5,482,798. The smaller average particle size of expanded graphite relative to conventional natural or synthetic crystalline graphite (e.g., 15 to 30 microns) was hypothesized to facilitate the formation of a conductive network typically at a lower volume fraction of graphite. An expanded graphite having an average particle size greater than about 30 microns was disclosed to provide no performance advantage in alkaline cells compared to a conventional non-expanded natural graphite having a comparable particle size. U.S. Pat. No. 5,482,798 also discloses that suitable amounts of expanded graphite can range from about 2 to 8 weight percent, and preferably from about 3 to 6 weight percent of the total cathode. Further, for expanded graphite contents of greater than about 10 weight percent no performance advantage is provided relative to equivalent amounts of unexpanded graphite particles in alkaline primary cells.

Various methods for preparing mixtures of manganese dioxide and graphite are known to provide suitable levels of electric conductivity in cathodes of alkaline cells. Typically, graphite can be mixed dry or wet with manganese dioxide using any of a variety of conventional blending, mixing or milling equipment. For example, U.S. Pat. No. 5,482,798 discloses the use of a twin cylinder mixer or a rotary tumbling mixer to dry mix graphite and manganese dioxide. In a subsequent step disclosed in U.S. Pat. No. 5,482,798 the formed mixture was wet-pulverized, preferably in water, using a horizontal media mill such as a ball mill or bead mill to decrease average manganese dioxide particle size to less than 10 microns.

Manganese dioxides suitable for use in alkaline cells include both chemically produced manganese dioxide known as "chemical manganese dioxide" commonly referenced in the art as "CMD" and electrochemically produced manganese dioxide known as "electrolytic manganese dioxide" commonly referenced as "EMD". CMD can be produced economically and in high purity, for example, by the methods described by Welsh et al. in U.S. Pat. No. 2,956,860. EMD is manufactured commercially by the direct electrolysis of a bath containing manganese sulfate dissolved in a sulfuric acid solution. Manganese dioxide produced by electrodeposition typically has high purity and high density. Processes for the manufacture of EMD and representative properties thereof are described in "Batteries", edited by Karl V. Kordesch, Marcel Dekker, Inc., New York, Vol. 1, 1974, pp. 433–488. EMD is the preferred type of manganese dioxide for use in alkaline cells. One consequence of the electrodeposition process is that the EMD typically retains a high level of surface acidity from the sulfuric acid of the electrolysis bath. This acidity in residual surface can be neutralized for example, by treatment with an aqueous base solution. Suitable aqueous bases include: sodium hydroxide, ammonium hydroxide (i.e., aqueous ammonia), calcium hydroxide, magnesium hydroxide, potassium hydroxide, lithium hydroxide, and any combinations thereof. Typically, commercial EMD is neutralized with a strong base such as sodium hydroxide because it is both highly effective and economical.

Thus, even though considerable effort has been expended to improve cathode conductivity, as evidenced by the prior art cited hereinabove, the conductive carbon and/or graphite employed therein require additional refinement in order to improve substantially the discharge performance and service life of alkaline electrochemical cells.

SUMMARY OF THE INVENTION

It is a principal objective of the present invention to produce an improved cathode comprising manganese dioxide and graphite material comprising treated graphitized mesophase pitch-based carbon fibers (GMPCF) to provide an improvement in cathode conductivity and discharge performance.

An aspect of the present invention is directed to producing an alkaline primary cell having increased service life as well as improved discharge performance at high rate of discharge, e.g. between about 0.5 and 1-Watt or 0.5 to 2-Amps.

The present invention provides a conductive cathode consisting of predominantly manganese dioxide admixed with a small amount of electrically conductive graphitized mesophase pitch-based carbon fibers (GMPCF). The graphitized mesophase pitch-based carbon fibers are preferably chemically treated before admixing with the $MnO_2$ to produce the treated graphitized mesophase pitch-based carbon fibers (treated GMPCF). Preferably the graphitized mesophase pitch-based carbon fibers are treated with potassium hydroxide (KOH) at high temperature before admixing with $MnO_2$. The treated graphitized mesophase pitch-based carbon fibers when used in admixture with particulate manganese dioxide to form a cathode mixture results in higher conductivity of the cathode mixture for a given amount of carbon. The treated graphitized mesophase pitch-based carbon fibers also function as a binder for the particulate manganese dioxide. Such treated graphitized mesophase pitch-based carbon fibers have a higher BET surface area and are softer and thus less resilient than the untreated graphitized mesophase pitch-based carbon fibers during the compressing process of making the cathode. It is theorized that this combination of factors leads to the higher electric conductivity of cathodes comprising $MnO_2$ and the treated graphitized mesophase pitch-based carbon fibers. Such cathodes are more easily compacted. The softer carbon fibers and higher BET surface area of the fibers appear to result in better intimate contact between the fibers with each other and with the $MnO_2$ particles, in turn leading to higher conductivity.

The treated graphitized mesophase pitch-based carbon fibers (treated GMPCF) of the invention have a mean average BET surface area of between about 10 and 60 $m^2/g$, preferably between about 10 and 50 $g/m^2$. Desirably, the treated graphitized mesophase pitch-based carbon fibers have a mean average BET surface area of between about 30 and 60 $m^2/g$, advantageously between about 30 and 50 $m^2/g$. Such treated graphitized mesophase pitch-based carbon fibers have a length typically of between about 20 and 200 micron, with a mean average length of between about 40 and 150 micron, and a mean average diameter between about 1 and 10 micron, typically between about 4 and 7 micron. The treated graphitized mesophase pitch-based carbon fibers (treated GMPCF) also have a crystal size Lc in the "c" direction of between about 50 and 300 Angstrom, for example, between about 50 and 250 Angstrom, more typically between about 100 and 200 Angstrom in the "c" direction (crystal thickness), and a crystal crystal size La of between about 100 and 300 Angstrom, typically about 200 Angstrom in the "a" direction. (The crystal size Lc in the "c" direction of the treated mesophase pitch-based carbon fibers of the invention have been determined to be smaller than the crystal size Lc of untreated mesophase pitch-based carbon fibers.)

The weight ratio of graphite material to $MnO_2$ in an alkaline cell cathode, irrespective of the percent by weight of $MnO_2$ in the cathode, is between about 0.05 (1:20) and 0.085 (1:12). The total graphite material in a representative alkaline cell cathode is between about 4 and 10 percent by weight of the cathode. In accordance with a specific aspect of the invention the total graphite material can be composed entirely of the treated graphitized mesophase pitch-based carbon fibers of the invention or entirely of a mixture of treated graphitized mesophase pitch-based carbon fibers and graphite including natural and expanded graphite. Alternatively, the treated graphitized mesophase pitch-based carbon fibers can make up a fraction of the total graphite material, for example, between about 1 and 100 percent by weight, desirably between about 5 and 50 percent by weight of the total graphite material in the cathode. In such case the remainder of the graphite material can be composed of other graphites for example, natural or expanded graphites or mixtures thereof.

The treated graphitized mesophase pitch-based carbon fibers also have the property that makes a cathode mixture comprising MnO2, treated graphitized mesophase pitch-based carbon fibers and aqueous KOH easier to compact. The cathode mixture can be prepared wet by mixing the $MnO_2$, treated and untreated graphitized mesophase pitch-based carbon fibers together with aqueous potassium hydroxide (KOH). The wet mixture can then be compacted and inserted into the cell casing or the wet mixture can be inserted into the cell and compacted while in the cell. Such cathode comprising the graphitized mesophase pitch-based carbon fibers exhibits increased conductivity and high bulk density of the $MnO_2$ (EMD), allowing for a high loading of manganese dioxide (EMD) in the cell.

Alternatively, a mixture of $MnO_2$ and treated graphitized mesophase pitch-based carbon fibers can be mixed while dry and the resulting dry mixture compacted into the cell. Aqueous potassium hydroxide solution can then be added to the compacted dry mixture in the cell. The aqueous KOH is readily absorbed into the dry mixture to form the cathode. This can result in a cathode of increased conductivity and high bulk density resulting in even higher loading of $MnO_2$ therein. Also the compacted dry mixture of $MnO_2$ and treated graphitized mesophase pitch-based carbon fibers can absorb the aqueous potassium hydroxide solution quickly and in a large amount, due to the porous structure of treated graphitized mesophase pitch-based carbon fiber. This can result in a cathode of increased electrolyte absorption and resulting in even higher performance for high rate discharge.

Definitions

The term "graphite" or "graphite material" as used herein shall include natural and synthetic graphites, expanded graphites, graphitized carbon, and graphitized carbon fibers. The term "graphitized carbon fibers" shall mean carbon fibers which have a basic graphite crystalline structure as defined by the International Committee for Characterization and Terminology of Carbon (ICCTC, 1982) as published in the *Journal Carbon*, Vol 20, p. 445. Such graphitized carbon fiber can be obtained by subjecting carbon fiber to a graphitization process, which normally involves heating carbon or carbon fibers at very high temperatures, typically between about 2500° C. and 3000° C. to obtain the characteristics of the basic graphite structure which is a three-dimensional crystalline structure comprised of ordered layers of hexagonally arranged carbon atoms stacked parallel to each other as referenced in the International Committee for Characterization and Terminology of Carbon (ICCTC, 1982). It will be appreciated that such graphitized carbon fibers can be broadly classified as such despite that their average BET surface area and crystalline size (La and Lc) can be altered by the methods described herein. The term "natural crystalline graphite" shall mean graphite that is minimally processed, i.e., essentially in its geologically occurring natural crystalline form. The term "synthetic graphite" as used herein shall mean synthetically prepared or processed graphite. Synthetic graphite can have crystal structure and morphological properties that are the same or similar to natural graphite or can have a different structure. The term "synthetic graphite" as used herein unless further qualified is also intended to include various expanded forms of graphite (including expanded graphite that has been exfoliated). The term "expanded graphite" is a recognized term of art, for example, the form of graphite generally as referenced in U.S. Pat. No. 5,482,798. Further, expanded graphite as used herein can be formed from natural and/or synthetic non-expanded graphite processed so as to have a uniaxially expanded crystal lattice. The extent of uniaxial expansion can be sufficiently large such that the expanded graphite particles can completely exfoliate (i.e., separate into thin laminae). The term "flaky" as commonly used in connection with graphites, (i.e., natural or synthetic flaky graphites) is intended to reflect that such graphites have a plate-like, non-expanded particle form.

The term "carbon fiber" shall mean elongated strands of carbon having a length to diameter ratio greater than about 4, typically greater than 8 and up to about 30 or more. Mesophase pitch-based carbon fibers is a known and commercially available type of carbon fiber. It is made by thermally treating "pitch". Pitch is a well known material which is a carbonaceous tacky tar residue, typically a petroleum tar residue as defined, for example, in Hawley, Condensed Chemical Dictionary, Tenth Edition. Mesophase pitch is made by chemically treating pitch as described, for example, in U.S. Pat. No. 4,005,183, Japanese Patent 57-42924 (corresponds to U.S. Pat. No. 4,303,631), U.S. Pat. No. 4,208,267, Japanese Patent 58-18421, Japanese Patent 63-120112 (corresponds to U.S. Pat. No. 4,822,587), or in the references Mochida, *Carbon*, Vol. 13, p.135 1975, Park and Mochida, *Carbon*, Vol. 27, p.925 (1989), and Mochida, *Carbon*, Vol. 27, p.843 (1989). The mesophase pitch is an intermediate phase which is a liquid crystal. The mesophase liquid crystal can be formed in tar or pitch by heating such material at elevated temperatures, typically between about 350° C. and 450° C. The mesophase tar or mesophase pitch resulting from heating such material was first reported and described in Taylor, G. H.,"Development of Optical Properties of Coke During Carbonization", *Fuel*, Vol. 40, p. 465 (1961). Mesophase pitch characteristically have molecules which are highly oriented in one direction which makes the material more readily graphitizable. Such molecular orientation of the mesophase pitch is described in Brooks, J. D. and Taylor, G. H., *Chemistry and Physics of Carbon*, Vol. 4, p. 243 (1968). Thus, the term mesophase pitch shall have the ordinary and accepted meaning as used in the art as applied to pitch which has been heat treated to obtain the mesophase liquid crystalline phase structure with respect to such pitch material. The mesophase pitch can be made into mesophase pitch-based carbon fiber (MPCF) by first thermal extruding the mesophase pitch material at elevated temperature of about 200 to 350° C. as, for example, as described in Otani U.S. Pat. No. 4,016,247. The extruded mesophase pitch fiber, by way of nonlimiting example, is then typically subjected to oxidation, preferably by reheating the material in air at 250 to 350° C. to oxidize the extruded material as described for example in Otani, *Carbon*, Vol. 3, p.31 (1965). This material can then be subjected to heat treatment at temperature between 1000 to 1800° C., typically 1000° C. to 1200° C. in the presence of an inert gas such argon as described for example in Otani, *Carbon*, Vol. 3, p. 31 (1965). The end product is mesophase pitch-based carbon fiber, which is a recognizeable type of carbon fiber known and referenced in the art by such name. Thus, the term "mesophase pitch-based carbon fiber" as used in this application is intended to refer to such material as it is ordinarily known and referenced in the art.

The mesophase pitch-based carbon fiber can then be graphitized by conventional methods used to graphitize carbon. The graphitization process normally involves heating the fiber at very high temperatures typically between about 2500° C. and 3000° C. as is known in the art. Such graphitization processes, by way of non limiting example, can involve treating the carbon fibers with heat to a temperature of above 2500° C., more desirably between 2800° C. and 3000° C., or at temperature sufficient to obtain the characteristics of an ordered three-dimensional graphite crystalline structure consisting of layers of hexagonally arranged carbon atoms stacked parallel to each other as defined by the International Committee for Characterization and Terminology of Carbon (ICCTC, 1982), published in the *Journal Carbon*, Vol. 20, p. 445. The graphite is further characterized by ordered d-spacing between graphite layers (ordered layers), and crystalline sizes Lc and La in the c and a directions of the crystalline structure, respectively. Thus, the term graphitized mesophase pitch-based carbon fibers (GMPCF) is a type of graphite material and shall mean mesophase pitch-based carbon fibers that have been subjected to such conventional graphitization processes.

The term "treated graphitized mesophase pitch-based carbon fibers" (treated GMPCF) shall mean graphitized mesophase pitch-based carbon fibers that have been subsequently treated to increase the BET surface area thereof. Such treatment, by way of non-limiting example, shall include heating the graphitized mesophase pitch-based carbon fibers with potassium hydroxide, KOH, sodium hydroxide, NaOH, or other oxidant agents at elevated temperatures. The treatment method includes methods that were disclosed in the reference of U.S. Pat. No. 4,082,694 (Wennerberg) and U.S. Pat. No. 4,039,473 (Schafer) which are described therein as applied to other types of carbons and not to graphitized carbons. Specifically, there is no contemplation in these references for treating a graphitized carbon fiber with KOH at high temperature to produce an improved graphitized fiber for application into the cathode of an alkaline cell to improve the electrical conductivity of the cathode. U.S. Pat. No. 4,946,663 (Audley) discloses treatment of carbonized fibers or carbonized carbon mats such as "charcoal-cloth" or simply non-carbonized material carbon fiber precursor such as rayon with KOH at high temperature in order to increase the surface area of such material. The fibers treated with KOH in either case are not graphitized. There is no mention or concern in this reference with treating graphitized carbon fibers with KOH. There is no mention or contemplation in this reference or the references U.S. Pat. No. 4,082,694 (Wennerberg) and U.S. Pat. No. 4,039,473 (Schafer) of treating a graphitized carbon fiber with KOH at high temperature to increase both BET surface area of such graphitized carbon fiber and increase the electrical conductivity of a cathode employing such material.

In the present invention it has been determined that such treatment methods when applied to graphitized mesophase pitch-based carbon increases the BET surface area of the graphitized mesophase pitch-based carbon fibers and increases the electrical conductivity of cathode mixtures comprising $MnO_2$ (EMD) and graphitized mesophase pitch-based carbon fibers.

The term BET surface area ($m^2/g$) as used herein shall mean the standard measurement of particulate surface area by gas (nitrogen and/or other gasses) porosimetry as is recognized in the art. The BET surface area measures the total surface area on the exterior surface of the particle or fiber and also that portion of surface area defined by the open pores within the particle or fiber available for gas adsorption and deadsorption when applied. BET surface area determinations (Brunauer, Emmett and Taylor method) as reported herein is carried out in accordance with ASTM Standard Test Method D4820-99. The graphite powder or graphitized carbon fibers can be outgassed under vacuum at 150° C. for 7 hours in an instrument such as Quantachrome Autosorber Model 6 manufactured by Quantachrome Co. The BET surface area can be determined from nitrogen gas adsorbate and use of a multi-point BET equation to calculate the BET surface using the software provided by the instrument manufacturer.

BRIEF DESCRIPTION OF THE DRAWINGS

The FIG. 1 is a cross-sectional cut away view of an alkaline cell having a cathode of the invention.

DETAILED DESCRIPTION

Cathodes mixtures, e.g. for $Zn/MnO_2$ alkaline cells, can be prepared in accordance with the invention by employing the treated graphitized mesophase pitch-based carbon fibers (treated GMPCF) in admixture with particulate manganese dioxide (EMD). Such mixture has been determined to have a lower resistivity than conventional $MnO_2$/graphite or $MnO_2$/untreated graphitized mesophase pitch-based carbon fiber mixtures of same weight percent $MnO_2$. This results in an increase in alkaline cell service life of between about 13 to 26 percent, particularly at high power applications such as 1-Watt constant power applications or applications requiring between about 0.5 and 2-Amp loading. The improvement in service life in such applications can be obtained when cathodes are formed from comprising manganese dioxide (EMD) and graphite, preferably graphitized mesophase pitch-based carbon fibers which have been treated with KOH at high temperature. The graphite can include mixtures of untreated graphitized mesophase pitch-based carbon fibers and treated graphitized mesophase pitch-based carbon fibers. Preferably, all or essentially all of the graphitized mesophase pitch-based carbon fibers in the cathode has been pretreated with KOH at high temperature. It will be appreciated that some of the conductive graphite material in the cathode can include conventional natural and expanded graphites. In such case the treated graphitized mesophase pitch-based carbon fibers of the invention will comprise a fraction of the total graphite in the cathode. For example, the alkaline cell cathode could have the following representative composition:

Electrolytic manganese dioxide (80–87 wt %), graphite (4–10 wt %), optional polyethylene binder (0.1 to 0.5 wt %) and remainder a 7–10 wt % KOH solution ("aqueous KOH solution between about 30–40 wt % KOH concentration").

In accordance with the present invention all or a portion of the graphite material in the cathode, desirably between about 4 to 10 percent by weight of the cathode, can be composed of the treated graphitized mesophase pitch-based carbon fibers of the invention. The use of the treated graphitized mesophase pitch-based carbon fibers in the cathode is desirable irrespective of the $MnO_2$ loading, that is, irrespective of the percent by weight $MnO_2$ therein. For example, alkaline cell cathodes having a $MnO_2$ composition between about 40 and 87 percent by weight are known. The present invention utilizing the treated graphitized mesophase pitch-based carbon as conductive graphite or portion of the total conductive graphite in the cathode is equally applicable to such cells.

Desirably the weight ratio of total conductive graphite to $MnO_2$ in the cell, irrespective of the percent by weight $MnO_2$ therein, is between about 0.05 (1:20) and 0.085 (1:12). In accordance with the invention the cathode can be composed entirely of the treated graphitized mesophase pitch-based carbon fibers of the invention or entirely of a mixture of treated and untreated graphitized mesophase pitch-based carbon fibers. Alternatively, the treated graphitized mesophase pitch-based carbon fibers can make up a fraction of the total conductive graphite, for example, between about 1 and 100 percent by weight, desirably between about 5 and 50 percent by weight of the total conductive graphite material in the cathode. In such case the remainder of the graphite material can be composed of other graphite materials for example, natural or expanded graphite or mixtures thereof.

The treated graphitized mesophase pitch-based carbon fibers (treated GMPCF) of the invention have a mean average BET surface area of between about 10 and 60 $m^2/g$, preferably between about 10 and 50 $g/m^2$. Desirably, the treated graphitized mesophase pitch-based carbon fibers have a mean average BET surface area of between about 30 and 60 $m^2/g$, advantageously between about 30 and 50 $m^2/g$. The treated graphitized mesophase pitch-based carbon fibers of the invention preferably have a mean average diameter between about 1 and 10 micron, preferably between about 4 and 7 micron. These carbon fibers have a length typically in a range between about 20 to 200 micron with the mean average length between about 40 and 150 micron and a real density of between 2.19 and 2.26 $g/cm^3$. Such treated graphitized mesophase pitch-based carbon fibers have a higher BET surface area and are softer and less spring-back after compaction pressure is released than the untreated graphitized mesophase pitch-based carbon fibers. Such cathodes are more easily compacted. The softer carbon fibers and higher BET surface area of the fibers are theorized to result in better intimate contact between the fibers with each other and with the $MnO_2$ particles, in turn leading to higher electrical conductivity.

The treated graphitized mesophase pitch-based carbon fibers of the invention have small crystalline sizes Lc in the "c" direction measured by x-ray diffraction between 50 and 300 Angstrom, for example, between 50 and 250 Angstrom, more typically between 100 and 200 Angstrom. The treated graphitized mesophase pitch base carbon fibers have an unchanged La in the "a" direction of between about 100 and 300 Angstrom, typically about 200 Angstrom. This compares to untreated graphitized mesophase pitch-based carbon fibers, which typically have crystal sizes of Lc in the "c" direction of between about 300 to 400 Angstrom and an La in the "a" direction of between about 100 and 300 Angstrom, typically about 200 Angstrom. Thus, it is clear that the treated graphitized mesophase pitch-based carbon fibers have a smaller crystal size Lc in the "c" direction than untreated graphitized mesophase pitch-based carbon fibers. Crystal sizes La and Lc, is standard terminology used in the art for the crystal sizes in the "a" and "c" directions, respectively, of a graphite crystal. The La in "a" direction represents the overall size of the crystal structure in the large surface planar direction and Lc in "c" direction represents the crystal thickness of a.

The treated graphitized mesophase pitch-based carbon fibers of the invention are prepared in the following manner. A graphitized mesophase pitch-based carbon fibers (GMPCF) having a mean average of between about 5 and 10 micron in diameter, 20 to 200 micron in length available under the trade designation of TA-1F, DKE-X, 42C, 42D, and LB-3F from BP Amoco Company are treated with KOH under high temperature. The treatment process involves preparing a mixture of the graphitized mesophase pitch-based carbon fibers with 97% concentrated solid KOH pellets at weight ratio of 1 part of carbon fiber (GMPCF) to between about 2 and 20 parts by weight of KOH, desirably 1 part carbon fiber and between about 5 and 20 parts by weight KOH, desirably 1 part of carbon fiber and between about 5 and 10 parts by weight KOH. The mixture is then heated in a furnace at temperatures between about 800 and 1200° C., preferably between about 800 and 1000° C. for a period of about 60 and 120 minutes, preferably with nitrogen and other inactive gases flowing therethrough. The heating ramp is about 3 to 5 hours from room temperature to the desired temperature. The resulting treated graphitized mesophase pitch-based carbon fibers were cooled to room temperature, washed with distilled water, then filtered. The pH of the filtrate was measured. Such operation was repeated for at least five times till the final pH of filtrate was reduced to around 8 to 10. The material was then dried in an oven at 80–100° C. temperature in air for 3 to 5 hours before using. It has been determined that different levels of increased BET surface area can be obtained by treating the graphitized mesophase pitch-based carbon fibers (GMPCF) with solid KOH at the elevated temperatures between about 800 and 1200° C., preferably between 800 and 1000° C. with different weight ratios of said graphitized carbon fiber to KOH. Specifically, at 800° C. it has been determined that a BET surface area in the range between 10 and 50 $m^2/g$ can be obtained if the weight ratio of KOH to said graphitized carbon fiber is in a range between 2:1 (2.0) to 10:1 (10.0), respectively, with the higher ratio of KOH to said graphitized carbon fibers giving the higher BET surface area. A BET surface area of between 30 and 50 $m^2/g$ can be obtained if the weight ratio of KOH to said graphitized carbon fiber is between about 5:1 (5.0) to 10:1 (10.0). Using this method BET surface areas up to about 60 $m^2/g$ can be obtained by heating the graphitized carbon fibers with solid KOH at 800° C. as above described but using much more KOH in proportion to the carbon, for example, the ratio of KOH to said graphitized carbon fibers should be increased up to about 20:1 (20.0), to obtain an average BET surface area of about 60 $m^2/g$.

Alternatively, it has been determined that by increasing the heating temperature, for example, to about 1000° C. then the same level of BET surface area can be achieved for said graphitized mesophase pitch-based carbon fibers (GMPCF), but with proportionally less KOH, that is, the weight ratio of KOH to the graphitized carbon fibers can be reduced. Namely, to achieve a BET surface area between about 10 to 50 $m^2/g$ at a heating temperature of 1000° C., the weight ratio of KOH to said graphitized carbon fibers can be between about 1:1 (1.0) and 10:1.5 (6.7), typically 1:1 (1.0) and 4:1 (4.0), with the higher ratio of KOH to graphitized carbon fibers giving the higher BET surface area. To achieve a BET surface area between about 30 to 50 $m^2/g$ at 1000° C. then the weight ratio of KOH to said graphitized carbon fibers can be between about 10:3 (3.3) and 10:1.5 (6.7). To achieve a BET surface area of about 60 $m^2/g$ or more at a heating temperature of 1000° C., the weight ratio of KOH to said graphitized carbon fibers is about 10:1 (10.0).

It has been determined that the same above indicated levels of BET surface area can be achieved at even somewhat lower proportions of KOH relative to graphitized carbon fibers, that is, higher ratios of said graphitized carbon fibers to KOH if the heating temperature is increased further, for example, up to about 1200° C.

There can be side reactions resulting from the heating of carbon fibers with KOH to cause release of CO and $CO_2$ gasses as described in literature such as by Yamashita and Ouchi in Carbon, Vol. 20, p.41 1982 and by Ehrburger et al. in Fuel, Vol. 65, p.1447 1986. When temperatures reach much above 1200° C. such gasses can react adversely with the carbon fibers thereby possibly causing deterioration in the carbon fibers crystalline structure. Therefore, there is a practical limit at which the heating of the graphitized carbon fiber with KOH can be accomplished.

A variation of such process has been applied to other carbon materials such as coal, lignite, and coke wherein such carbon material was blended into a KOH solution and subsequently treated at high temperature as disclosed in U.S. Pat. No. 4,039,473 (Schafer) and U.S. Pat. No. 4,082,694 (Wennerberg).

A representative alkaline cell utilizing the cathode mixture of the invention is shown in FIG. 1. The alkaline cell 610 comprises a cylindrical steel casing 620, having a closed end 614 and an open end 616. The cell is preferably filled with cathode mixture 612 of the invention comprising $MnO_2$ (EMD), and graphitized mesophase pitch-based carbon fibers, and aqueous KOH. Preferably the graphitized mesophase pitch-based carbon fibers have been pretreated with KOH at high temperature as described herein before admixing with $MnO_2$. The cathode mixture 612 can be prepared wet, for example, with aqueous KOH included in the mixture before the mixture is inserted into the cell. The wet mixture can be compacted while in the cell. Alternatively, the wet mixture can be compacted into disks 612a before insertion into the cell. Alternatively, the cathode mixture 612 can be prepared by first dry mixing the $MnO_2$ (EMD) with the treated graphitized mesophase pitch-based carbon fibers. (Preferably, the treated graphitized mesophase pitch-based carbon fibers have been pretreated with KOH at high temperatures as described herein.) The dry mixture can be compacted into the cell or can be compacted into disk shaped blocks 612a, which can be inserted into the cell in stacked arrangement. A separator sheet 690 can be placed against the inside surface of cathode disks 612a. Aqueous KOH electrolyte can be poured over the dry cathode wherein it becomes absorbed into the separator and cathode. The anode material 615 can then be added to the cell.

Anode 615 comprises zinc and aqueous KOH electrolyte. The electrolyte in the anode comprises a conventional mixture of KOH, ZnO and gelling agent. The anode and cathode can be separated by a conventional ion porous separator 690, for example, comprising polyvinylalcohol and cellulosic fibrous material. After cell 610 is filled an insulating plug 660 is inserted into open end 616. Insulating plug 660 may be of polypropylene, talc filled polypropylene, sulfonated polyethylene or nylon. The plug 660 is preferably snap fitted around circumferential step 618 as shown in the figure so that the plug locks in place into the open end 616. The peripheral edge 627 of casing 620 is crimped over the top of insulating plug 660. A paper insulating washer 680 is applied over the crimped peripheral edge 627 of casing 620. Insulating washer 680 can be a polyethylene coated paper washer. A terminal end cap 630 is welded to the head of current collector 640. An elongated current collector 640 is then inserted (force fitted) into aperture 644 of insulating plug 660 so that end cap 630 comes to rest against insulating washer 680. Current collector 640 can be selected from a variety of known electrically conductive metals found to be useful as current collector materials, for example, brass, tin plated brass, bronze, copper or indium plated brass. The current collector 640 used in the test cells was of brass. Conventional asphalt sealant may be preapplied around the current collector 640 before it is inserted into aperture 644. A film label 670 is applied around casing 620. The terminal end cap 630 becomes the negative terminal of alkaline cell 610 and pip 625 at the closed end of casing 520 becomes the positive terminal.

The cell 610 shown in the figure can be an AA cell. However, the alkaline cell shown in the figure is not intended to be restricted to any particular size. Thus, the present invention is applicable to AAAA, AAA, C and D size cylindrical alkaline cells as well as button size alkaline cells of any size or shape. Alkaline cell 610 is not intended to be restricted to any particular cell chemistry or cell size, except that the cathode 612 is prepared utilizing the cathode mixture invention comprising $MnO_2$ (EMD) and graphitized mesophase pitch-based carbon fibers (GMPCF), preferably graphitized mesophase pitch-based carbon fibers which has been treated at high temperatures with KOH (treated GMPCF).

Thus cell 610 can contain conventional alkaline cell anode chemistries including those which contain zero added mercury (less than 50 parts mercury per million parts total cell weight, preferably less than 10 parts mercury per million parts total cell weight) and modifications thereof. Such representative chemistries, for example, are disclosed in U.S. Pat. No. 5,401,590, herein incorporated by reference. The cell 610 of the invention also preferably does not contain added amounts of lead and thus can be essentially lead free, that is, the total lead content is less than 30 ppm, desirably less than 15 ppm of total metal content of the anode. Also, although the invention is principally directed to primary alkaline cells the anode and cathode chemistries can be adjusted so that the cells become secondary (rechargeable) cells as is known in the art.

The following examples show the benefit of employing alkaline cell cathodes comprising a mixture a $MnO_2$ (EMD) and treated graphitized mesophase pitch-based carbon fibers of the invention. In each of the following examples the cathode was prepared wet and compacted into cathode disks 612a while wet. The compacted disks 612a were inserted into the cell in stacked arrangement as shown in the figure.

EXAMPLE 1

Cathode Resistivity

Alkaline cathodes were prepared by mixing EMD with (1) untreated graphitized mesophase pitch-based carbon fibers (TA-1F, DKE-X, 42C, 42D, LB-3F, all from BP Amoco), (2) treated graphitized mesophase pitch-based carbon fibers as described above, (3) natural flaky graphite (MP0702X), and (4) expanded graphite DCN-2, at two different EMD/graphite weight ratios of 12:1 and 20:1. Around 0.7-gram cathode powder then were compressed into a pellet with 12.75 mm in diameter and 1.6–1.8 mm in thickness. The pellet then was subjected to resistivity measurement by using a four-point resistivity meter (LORESTA AP MCP-T400 by Mitsubishi). Four pellets were measured in both surfaces of each pellet so that an average of eight data points was obtained.

The following Table 1 illustrates the changes in BET surface area of graphitized mesophase pitch-based carbon fibers before and after treatment, and their cathode resistivity in the presence of KOH electrolyte in cathode. As the comparison, cathodes using natural flake graphite and expanded graphite were listed together.

TABLE 1

BET surface area and cathode resistivity changes in cathodes using different graphite materials

| Graphite | BET Surface Area, $m^2/g$ | | Cathode Resistivity, ohm-cm at 12:1 weight ratio of EMD/Carbon fibers | | Cathode Resistivity, ohm-cm at 20:1 weight ratio of EMD/Carbon fibers | |
|---|---|---|---|---|---|---|
| | Before Treatment[1] | After Treatment[1] | Before Treatment[1] | After Treatment[1] | Before Treatment[1] | After Treatment[1] |
| Graphitized Carbon Fibers[2] TA-1F | 0.74 | 27.6 | 2.472 | 0.095 | N/A | N/A |
| Graphitized Carbon Fibers[2] DKE-X | 4.72 | 21.6 | 1.971 | 0.307 | N/A | N/A |
| Graphitized Carbon Fibers[2] 42C | 0.787 | 10.1 | N/A | N/A | 2.77 | 0.238 |
| Graphitized Carbon Fibers[2] 42D | 0.711 | 11.6 | N/A | N/A | 2.223 | 0.272 |
| Graphitized Carbon Fibers[2] LB-3F | 0.814 | 40.3 | N/A | N/A | 2.85 | 0.081 |
| Natural Flaky Graphite MP0702X | 8.1 | N/A | 0.247 | N/A | 0.814 | N/A |
| Expanded Graphite DCN-2 | 20.7 | N/A | 0.0485 | N/A | 0.188 | N/A |

Notes:
[1]Treatment with KOH at high temperature between 800° C. and 1000° C. with ratios of KOH to graphitized carbon fibers between 10:1 (10.0) and 2:1 (2.0) for a period between about 60 and 120 minutes.
[2]All carbon fibers listed are graphitized mesophase pitch-based carbon fibers from B.P. Amoco Co.

EXAMPLE 2

Alkaline Cell Performance

AA size $MnO_2$/Zinc alkaline cells were made from cathodes using untreated GMPCF, natural flake graphite, and expanded graphite and Zinc anode.

The anode material comprised: 62 to 69 wt % of zinc alloy (99.9 wt % zinc containing indium) powder; 35–40 wt % of aqueous KOH electrolyte solution (containing about 2 wt % ZnO in addition); 0.5 to 2 wt % of a cross linked acrylic acid polymer gelling agent (e.g., CARBOPOL C940 available from B. F. Goodrich); 0.01 to 0.5 wt. % of a hydrolyzed polyacrylonitrile grafted unto a starch backbone (e.g., Waterlock A-221 available from Grain Processing Co.; and about 50 ppm of a dionyl phenol phosphate ester surfactant (e.g., RM-510 available from Rhône-Poulenc). The average particle size of the zinc alloy powder is desirably between about 30 and 350 micron. The amount of zinc anode in the cell was 5.5–6.0 grams. The bulk density of the zinc alloy powder in the anode was between about 1.75 and 2.2 grams zinc per cubic centimeter of anode. The percent by volume of electrolyte solution in the anode was between about 69.2 and 75.5 percent by volume of the anode. The anode contained no added mercury and no added lead. Thus, the mercury content in the anode was less than about 50 parts per million parts mercury, preferably less than 20 parts per million parts mercury by weight zinc. The lead content in the anode is less than 30 ppm, preferably less than 15 ppm of the zinc content in the anode.

The cathode composition comprised $MnO_2$ (EMD), untreated graphitized mesophase pitch-based carbon fibers, natural flake graphite, aqueous KOH solution, and polymer binder. The cathode composition was as follows:

| Cathode Composition [1, 2]: | |
|---|---|
| | Wt. % |
| $MnO_2$ (EMD) | 85.52 |
| Untreated graphitized mesophase pitch-based carbon fibers[3] | 2.27 |
| Natural flake graphite[4] (MP0702X) | 5.0 |
| Aqueous KOH solution (35 to 40 wt. % KOH) | 6.91 |
| Polymer binder | 0.3 |
| Total | 100.00 |

Notes:
[1]After compaction of the cathode within the cell, the bulk density of cathode was 3.30 to 3.40 g/cm³.
[2]The resistivity of the cathode described above at 20° C. was 0.339 Ohm-cm.
[3]The untreated graphitized mesophase pitch-based carbon fibers had a mean average diameter of about 7-micron and BET surface area of 0.74 m²/g.
[4]The natural flake graphite MP0702X had a mean average particle size distribution of about 15 micron and BET surface area of 8.8 m²/g.
[5]The fresh alkaline cells were discharged at a constant current of 2-Amps and a constant power of 1-Watt. In addition, the cells were put in storage at 55° C. for two weeks, then tested under a constant power of 1-Watt. The cell performance as service hours under such high drains were summarized in Tables 2 and 3 at the end of this disclosure.

EXAMPLE 3

The same size AA cells as in comparative example 2 were prepared. The cells had the identical anode composition and identical cell components as in Example 2 except that the cathode had the following composition and employed treated graphitized mesophase pitch-based carbon fibers (treatment temperature 800° C., KOH to carbon fiber ratio 8:1).

| Cathode composition (Example 3): | |
|---|---|
| | Wt. % |
| $MnO_2$ (EMD) | 88.3 |
| Treated graphitized mesophase pitch-based carbon fibers[3] | 4.5 |
| Aqueous KOH solution (35 to 40 wt. % KOH) | 6.9 |
| Polymer binder | 0.3 |
| Total | 100.0 |

Notes:
[1]After compaction of the cathode within the cell, the bulk density of the cathode was 3.30–3.40 g/cm³.
[2]The resistivity of the cathode at 20° C. was 0.201-Ohm cm.
[3]The treated graphitized mesophase pitch-based carbon fibers had a mean average diameter of about 7-micron and BET surface area of 27.6 m²/g. The graphitized mesophase pitch carbon fibers were treated at high temperature of 800° C. with 8 part of KOH per part of carbon fibers by weight as above described.
[4]The cells were discharged as described in Example 2. Cell performances were summarized at the end of this disclosure.

EXAMPLE 4

The same size AA cells as in comparative Examples 2 to 3 were prepared. The cells had the identical anode composition and identical cell components as in Examples 2 to 3 except that the cathode had the following composition and employed treated graphitized mesophase pitch-based carbon fibers (treatment temperature 800° C., KOH to carbon fiber ratio 8:1) and natural flake graphite at ratio of 50:50.

| Cathode composition [1] (Example 4): | |
|---|---|
| | Wt. % |
| $MnO_2$ (EMD) | 88.3 |
| Treated graphitized mesophase pitch-based carbon fibers[2] | 2.25 |
| Natural flaky graphite[3] | 2.25 |
| Aqueous KOH solution (35 to 40 wt. % KOH) | 6.9 |
| Polymer binder | 0.3 |
| Total | 100.0 |

Notes:
[1]After compaction of the cathode within the cell, the bulk density of the cathode was 3.30–3.40 g/cm³.
[2]The treatment and physical properties of treated graphitized mesophase pitch-based carbon fibers have been described in Example 3.
[3]MP0702X described in Example 2
[4]Cell performance as described in Examples 2 to 3.

EXAMPLE 5

The same size AA cells as in comparative Examples 2 to 4 were prepared. The cells had the identical anode composition and identical cell components as in Examples 2 to 4 except that the cathode had the following composition and employed treated graphitized mesophase pitch-based carbon fibers (treatment temperature 1000° C., KOH to fibers ratio 4:1).

| Cathode composition[1, 2] (Example 5): | |
|---|---|
| | Wt. % |
| MnO$_2$ (EMD) | 88.3 |
| Treated graphitized mesophase pitch-based carbon fibers[3] | 4.5 |
| Aqueous KOH solution (35 to 40 wt. % KOH) | 6.9 |
| Polymer binder | 0.3 |
| Total | 100.0 |

Notes:
[1]After compaction of the cathode within the cell, the bulk density of the cathode was 3.30–3.40 g/cm$^3$.
[2]The resistivity of the cathode described above at 20° C. was 0.273-Ohm cm.
[3]The treated graphitized mesophase pitch-based carbon fibers had a mean average diameter of about 7-micron and BET surface area of 40.2 m$^2$/g. The graphitized mesophase pitch-based carbon fibers were treated at high temperature of 1000° C. with 4 parts by weight of KOH per part of carbon fibers by weight as above described.
[4]The cell performances as described in Examples 2 to 4.

EXAMPLE 6

The same size AA cells as in comparative Examples 2 to 5 were prepared. The cells had the identical anode composition and identical cell components as in Examples 2 to 5 except that the cathode had the following composition and employed treated graphitized mesophase pitch-based carbon fibers (treatment temperature 1000° C., KOH to carbon fiber ratio 4:1) and natural flake graphite at 50:50 ratio.

| Cathode composition[1] (Example 5): | |
|---|---|
| | Wt. % |
| MnO$_2$ (EMD) | 88.3 |
| Treated graphitized mesophase pitch-based carbon fibers[2] | 2.25 |
| Natural flaky graphite[3] | 2.25 |
| Aqueous KOH solution (35 to 40 wt. % KOH) | 6.9 |
| Polymer binder | 0.3 |
| Total | 100.0 |

Notes:
[1]After compaction of the cathode within the cell, the bulk density of MnO2 in the cathode was 3.30–3.40 g/cm3.
[2]As described in Example 5.
[3]As described in Example 2.
[4]The cell performances as described in Examples 2 to 5.

EXAMPLE 7

The same size AA cells as in comparative Examples 2 to 6 were prepared. The cell had the identical anode composition and identical cell components as in Examples 2 to 6 except that the cathode had the following composition and employed natural flake graphite.

| Cathode composition[1, 2] (Example 7): | |
|---|---|
| | Wt. % |
| MnO$_2$ (EMD) | 88.3 |
| Natural flaky graphite[3] | 4.5 |
| Aqueous KOH solution (35 to 40 wt. % KOH) | 6.9 |
| Polymer binder | 0.3 |
| Total | 100.0 |

Notes:
[1]After compaction of the cathode within the cell, the bulk density of MnO$^2$ in the cathode was 3.30–3.40 g/cm$^3$.
[2]The resistivity of the cathode described above at 20° C. was 0.874-Ohm cm.
[3]As described in Example 2
[3]The cell performances as described in Examples 2 to 6.

EXAMPLE 8

The same size AA cells as in comparative Examples 2 to 7 were prepared. The cells had the identical anode composition and identical cell components as in Examples 2 to 7 except that the cathode had the following composition and employed expanded graphite.

| Cathode composition[1, 2] (Example 8): | |
|---|---|
| | Wt. % |
| MnO$_2$ (EMD) | 88.3 |
| Expanded graphite DCN-2[3] | 4.5 |
| Aqueous KOH solution (35 to 40 wt. % KOH) | 6.9 |
| Polymer binder | 0.3 |
| Total | 100.0 |

Notes:
[1]After compaction of the cathode within the cell, the bulk density of MnO$_2$ in the cathode was 3.30–3.40 g/cm$^3$.
[2]The resistivity of the cathode described above at 20° C. was 0.188-Ohm cm.
[3]The expanded graphite DCN-2 had a mean average particle size distribution of about 20 micron and BET surface area of 20.7 m$^2$/g.
[4]The cell performances as described in Examples 2 to 7.

As performance summary, the following Tables 2 and 3 illustrate the service hours of AA size alkaline cells under constant current of 2-Amps and constant power of 1-Watt discharge described above, respectively. Significant performance improvement over alkaline cells using untreated graphitized mesophase pitch-based carbon fibers (GMPCF) and natural flake graphite have been reached.

TABLE 2

Service Hours of AA cells Discharged under Constant Current of 2-Amps

| Example | Cathode | Service hours at | | | |
|---|---|---|---|---|---|
| | | 1.1 V | 1.0 V | 0.9 V | 0.8 V |
| 2 | EMD/Untreated GMPCF/graphite | N/A | 0.051 | 0.269 | 0.356 |
| 3 | EMD/treated GMPCF | 0.052 | 0.185 | 0.320 | 0.434 |
| 4 | EMD/treated GMPCF/graphite | 0.058 | 0.192 | 0.324 | 0.438 |

TABLE 2-continued

Service Hours of AA cells Discharged under Constant Current of 2-Amps

| Example | Cathode | Service hours at 1.1 V | 1.0 V | 0.9 V | 0.8 V |
|---|---|---|---|---|---|
| 5 | EMD/treated GMPCF | 0.046 | 0.158 | 0.290 | 0.404 |
| 6 | EMD/treated GMPCF/graphite | 0.054 | 0.187 | 0.323 | 0.453 |
| 7 | EMD/graphite | 0.052 | 0.129 | 0.254 | 0.360 |
| 8 | EMD/expanded graphite | 0.053 | 0.180 | 0.306 | 0.440 |

TABLE 3

Service Hours of AA Cells Discharged under Constant Power of 1-Watt

| Example | Cathode | Fresh cells service hours at | | | | Stored cells service hour at | | | |
|---|---|---|---|---|---|---|---|---|---|
| | | 1.1 V | 1.0 V | 0.9 V | 0.8 V | 1.1 V | 1.0 V | 0.9 V | 0.8 V |
| 2 | EMD/Untreated GMPCF/graphite | 0.300 | 0.500 | 0.746 | 0.784 | 0.276 | 0.511 | 0.671 | 0.719 |
| 3 | EMD/treated GMPCF | 0.446 | 0.691 | 0.823 | 0.992 | 0.342 | 0.565 | 0.690 | 0.826 |
| 4 | EMD/treated GMPCF/graphite | 0.479 | 0.707 | 0.845 | 1.002 | 0.411 | 0.653 | 0.906 | 1.020 |
| 5 | EMD/treated GMPCF | 0.443 | 0.658 | 0.770 | 0.919 | 0.419 | 0.651 | 0.900 | 0.994 |
| 6 | EMD/treated GMPCF/graphite | 0.472 | 0.691 | 0.822 | 0.990 | 0.398 | 0.616 | 0.778 | 0.959 |
| 7 | EMD/graphite | 0.444 | 0.636 | 0.765 | 0.889 | 0.324 | 0.488 | 0.609 | 0.736 |
| 8 | EMD/expanded graphite | 0.490 | 0.735 | 0.916 | 1.064 | 0.462 | 0.695 | 0.941 | 1.046 |

EXAMPLE 9

Cathode Mechanical Strength

Cathode mechanical strength was measured by crashing cathode pellets made with different composition in a constant compress loading. The following Table 4 illustrates the test results for cathodes described through examples 3 to 8.

TABLE 4

Mechanical Strength of Cathode Using Different Graphite Materials

| Example | Cathode | Pellet strength, Newton |
|---|---|---|
| 3 | Containing treated GMPCF (800° C.) | 20.972 |
| 4 | Containing treated GMPCF (800° C.) /natural flake graphite | 21.656 |
| 5 | Containing treated GMPCF (1000° C.) | 20.775 |
| 6 | Containing treated GMPCF (1000° C.) /natural flake graphite | 20.989 |
| 6 | Containing natural flake graphite | 17.400 |
| 7 | Containing expanded graphite | 17.336 |

Although the invention has been described with respect to specific embodiments it will be appreciated that variations are possible without departing from the concept of the invention. Thus, the invention is not intended to be limited to the specific embodiments described herein but is defined by the claims and equivalents thereof.

What is claimed is:

1. An electrochemical cell comprising an anode, an aqueous alkaline electrolyte, and a cathode comprising manganese dioxide and graphite material, wherein said graphite material comprises graphitized carbon fibers having an average BET surface area of between 10 and 60 $m^2/g$.

2. The electrochemical cell of claim 1 wherein the cell is an alkaline cell having an anode comprising zinc.

3. The electrochemical cell of claim 1 wherein said electrolyte comprises an aqueous solution of potassium hydroxide.

4. The electrochemical cell of claim 1 wherein said carbon fibers having an average BET surface area of between 10 and 50 $m^2/g$.

5. The electrochemical cell of claim 4 wherein said carbon fibers comprises graphitized mesophase pitch-based carbon fibers.

6. The electrochemical cell of claim 5 wherein the graphite material in said cathode comprises a mixture of said graphitized mesophase pitch-based carbon fibers and flaky crystalline graphite.

7. The electrochemical cell of claim 5 wherein the graphite material in said cathode comprises a mixture of said graphitized mesophase pitch-based carbon fibers and expanded graphite.

8. The electrochemical cell of claim 1 wherein said carbon fibers having an average BET surface area of between 30 and 50 $m^2/g$.

9. The electrochemical cell of claim 8 wherein said carbon fibers comprises graphitized mesophase pitch-based carbon fibers.

10. The electrochemical cell of claim 1 wherein said carbon fibers have a crystalline size Lc in the crystal "c" direction of between 50 and 300 Angstrom and a crystalline size La in the crystal "a" direction of between 100 to 300 Angstrom.

11. The electrochemical cell of claim 1 wherein said carbon fibers have a crystalline size Lc in the crystal "c" direction of between 100 and 200 Angstrom and a crystalline size La in the crystal "a" direction of between 100 to 300 Angstrom.

12. The electrochemical cell of claim 1 wherein said carbon fibers comprises between 4 and 10 percent by weight of the cathode.

13. The electrochemical cell of claim 1 wherein the weight ratio of said carbon fibers to said manganese dioxide is between about 1:25 (0.04) to 1:10 (0.10).

14. The electrochemical cell of claim 1 wherein said carbon fibers comprises graphitized mesophase pitch-based carbon fibers.

15. The electrochemical cell of claim 14 wherein the graphite material in said cathode comprises between 4 and 10 percent by weight of said cathode and said graphitized mesophase pitch-based carbon fibers comprises between about 1 and 100 percent by weight of said graphite material.

16. The electrochemical cell of claim 14 wherein the graphite material in said cathode comprises between 4 and 10 percent by weight of said cathode and said graphitized mesophase pitch-based carbon fibers comprises between about 5 and 50 percent by weight of said graphite material.

17. The electrochemical cell of claim 1 wherein said carbon fibers comprises graphitized mesophase pitch-based carbon fibers which have been treated by heating said graphitized mesophase pitch-based carbon fibers with potassium hydroxide at a temperature between about 800° C. and 1200° C.

18. The electrochemical cell of claim 1 wherein said carbon fibers comprises graphitized mesophase pitch-based carbon fibers which have been treated by heating said graphitized mesophase pitch-based carbon fibers with potassium hydroxide at a temperature between about 800° C. and 1200° C. for a period between about 1 and 2 hours.

19. The electrochemical cell of claim 1 wherein said carbon fibers have a mean average diameter of between 1 and 10 micron.

20. The electrochemical cell of claim 1 wherein said carbon fibers have a mean average diameter of between 1 and 10 micron and a mean average length of between 40 and 150 microns.

21. An electrochemical cell comprising an anode, an aqueous alkaline electrolyte, and a cathode comprising manganese dioxide and graphite material, wherein said graphite material comprises graphitized mesophase pitch-based carbon fibers having an average BET surface area of between 10 and 60 $m^2/g$.

22. An electrochemical cell comprising an anode, an aqueous alkaline electrolyte, and a cathode comprising manganese dioxide and graphite material, wherein said graphite material comprises graphitized mesophase pitch-based carbon fibers having an average BET surface area of between 10 and 50 $m^2/g$.

23. The electrochemical cell of claim 22 wherein said graphitized mesophase pitch-based carbon fibers comprises between 4 and 10 percent by weight of said cathode.

24. An electrochemical cell comprising an anode, an aqueous alkaline electrolyte, and a cathode comprising manganese dioxide and graphite material, wherein said graphite material comprises graphitized mesophase pitch-based carbon fibers having an average BET surface area of between 30 and 50 $m^2/g$.

25. The electrochemical cell of claim 23 wherein said graphitized mesophase pitch-based carbon fibers comprises between 4 and 10 percent by weight of said cathode.

26. An electrochemical cell comprising an anode, an aqueous alkaline electrolyte, and a cathode comprising manganese dioxide and graphite material, wherein said graphite material comprises graphitized carbon fibers having an average BET surface area of between 10 and 60 $m^2/g$ and wherein said carbon fibers have a crystalline size Lc in the crystal "c" direction of between 50 and 300 Angstrom and a crystalline size La in the crystal "a" direction of between 100 to 300 Angstrom.

27. The electrochemical cell of claim 26 wherein said carbon fibers have a crystalline size Lc in the crystal "c" direction between 100 and 200 Angstrom.

28. The electrochemical cell of claim 26 wherein said carbon fibers have an average BET surface area of between 30 and 50 $m^2/g$.

29. The electrochemical cell of claim 26 wherein said carbon fibers comprises graphitized mesophase pitch-based carbon fibers.

* * * * *